United States Patent [19]

Dennison et al.

[11] Patent Number: 4,934,140
[45] Date of Patent: Jun. 19, 1990

[54] MODULAR GAS TURBINE ENGINE

[75] Inventors: William T. Dennison, Vernon; William G. Monsarrat, Baltic; Robert F. Brodell, Marlborough, all of Conn.

[73] Assignee: United Technologies Corporation, Hartford, Conn.

[21] Appl. No.: 193,473

[22] Filed: May 13, 1988

[51] Int. Cl.$^5$ .............................................. F02K 3/04
[52] U.S. Cl. ................................ 60/226.1; 60/39.161; 60/39.31; 244/54
[58] Field of Search ............... 60/226.1, 39.161, 39.31, 60/262; 244/54

[56] References Cited

U.S. PATENT DOCUMENTS

| | | | |
|---|---|---|---|
| 2,837,892 | 6/1958 | Van Acker | 60/39.161 |
| 3,720,060 | 3/1973 | Davies et al. | 60/226.1 |
| 3,761,205 | 9/1973 | Cronstedt | 417/407 |
| 3,823,553 | 7/1974 | Smith | 60/39.161 |
| 4,030,288 | 6/1977 | Davis et al. | 60/39.31 |
| 4,418,528 | 12/1983 | Pellow | 60/39.161 |
| 4,456,425 | 6/1984 | McCarty et al. | 415/122 R |
| 4,611,464 | 9/1986 | Hetzer et al. | 60/39.161 |
| 4,685,286 | 8/1987 | Hetzer et al. | 60/39.161 |
| 4,704,862 | 11/1987 | Dennison et al. | 60/226.1 |
| 4,722,184 | 2/1988 | Chaplin et al. | 60/226.1 |
| 4,722,666 | 2/1988 | Dennison et al. | 416/94 |
| 4,744,214 | 5/1988 | Monsarrat et al. | 60/226.1 |

Primary Examiner—Donald E. Stout
Attorney, Agent, or Firm—Norman Friedland

[57] ABSTRACT

A gas turbine fan engine with improved maintainability features is disclosed. Forward and rearward sections of the core of the engine are joined one to the other, and each are independently separable from the pylon on which the engine is mounted without the necessity of removing the other from the airplane.

23 Claims, 3 Drawing Sheets

MODULAR GAS TURBINE ENGINE

DESCRIPTION

1. Technical Field

A multiple rotor turbine fan engine is constructed in modules in such a manner that, for example, the fan rotor and pitch control for the fan, low pressure compressor and the gearbox may be removed as a module. Further, the front end of the engine may be broken into several packages or modules such as the nose cone and gearbox cover, the fan drive and gearbox support, the low pressure compressor and the fan rotor and pitch control for the fan.

2. Background Art

It is general practice to make an engine in modules which are separately removable from the basic engine for ease in shipment and assembly as well as for disassembly for replacement of certain parts. The present construction goes further in making different modules and in facilitating the ease of assembly and disassembly. The present concept is intended to also permit the removal of the entire core engine as a unit with a minimum of disassembly. Many constructions require removal of more or less of the main engine cowl for access to the engine supports. The present invention contemplates removal of the core engine or any of the several modules without removal of any portion of the surrounding main cowl and the support struts remain in position while the engine or modules are removed from within the main cowl or are repositioned within the main cowl.

DISCLOSURE OF INVENTION

According to the present invention a forward section and a rearward section of an airplane gas turbine engine core are separately removable from an airplane pylon, with the corresponding forward or rearward sections remaining on the airplane pylon. In one embodiment, the forward section includes the low pressure compressor and certain assemblies forward thereof; the rearward section includes the high pressure compressor and certain assemblies rearward thereof. Separation of the forward and rearward assemblies occurs at the point of attachment of the end shaft (186) of the low pressure rotor to the low pressure shaft (18) and a circle of bolts (186) on support structure inwardly of struts (6) extending across the fan stream from a main cowl (2). The main cowl and the forward or rearward section that is not disassembled remain affixed to the airplane at a pylon (4). Removal of the forward sections from the airplane may require disassembly from the fan rotor and pitch changing mechanism, such as at bolts (154) and (146), or, alternatively, disassembly of the fan rotor and pitch changing mechanism from the support structure at a circle of bolts (49).

According to a detailed embodiment of the invention, the rear core cowl (42) for an engine is removable to permit removal of the exhaust nozzle and also provide access to the connection between the core engine and the support struts. Removal of the rear core cowl permits access to the attachments for the low pressure compressor for removal of the compressor and the parts of the engine forward of the compressor as a unit. Further, the nose cone cowl and shroud ring may be separable and moved forward to provide access to the nose cone attachment and to permit access to the fan blade mounts for removal of the individual fan blades. With suitable access to the inner module attachments, the nose cone is removable as a unit or as a pat of the larger module including the fan rotor and support, the gearbox and the low pressure compressor.

The principal feature of the detailed embodiment of the present invention is an arrangement to provide access to the core engine by removal of the core cowls that define part of the inner wall of the fan gas path within the main cowl. Another feature is an arrangement to provide access to the fan blade mounting so that the fan blades may be separately removed thereby to permit forward removal of one or more modules at the front of the engine, such as the fan rotor and pitch changing mechanism, the gearbox and drive for the fan, and the gearbox support and the low pressure compressor.

The foregoing and other objects, features and advantages of the present invention will become more apparent from the following description of preferred embodiments and accompanying drawings.

BRIEF DESCRIPTION OF THE DRAWINGS

FIG.. 1 is a side view of a turbofan engine shown partly broken away.

FIGS. 1A, 1B and 1C are views which are partly broken away and partly in section of the forward, middle and aft sections of the engine of FIG. 1.

BEST MODE FOR CARRYING OUT THE INVENTION

Figures 1, 1A:
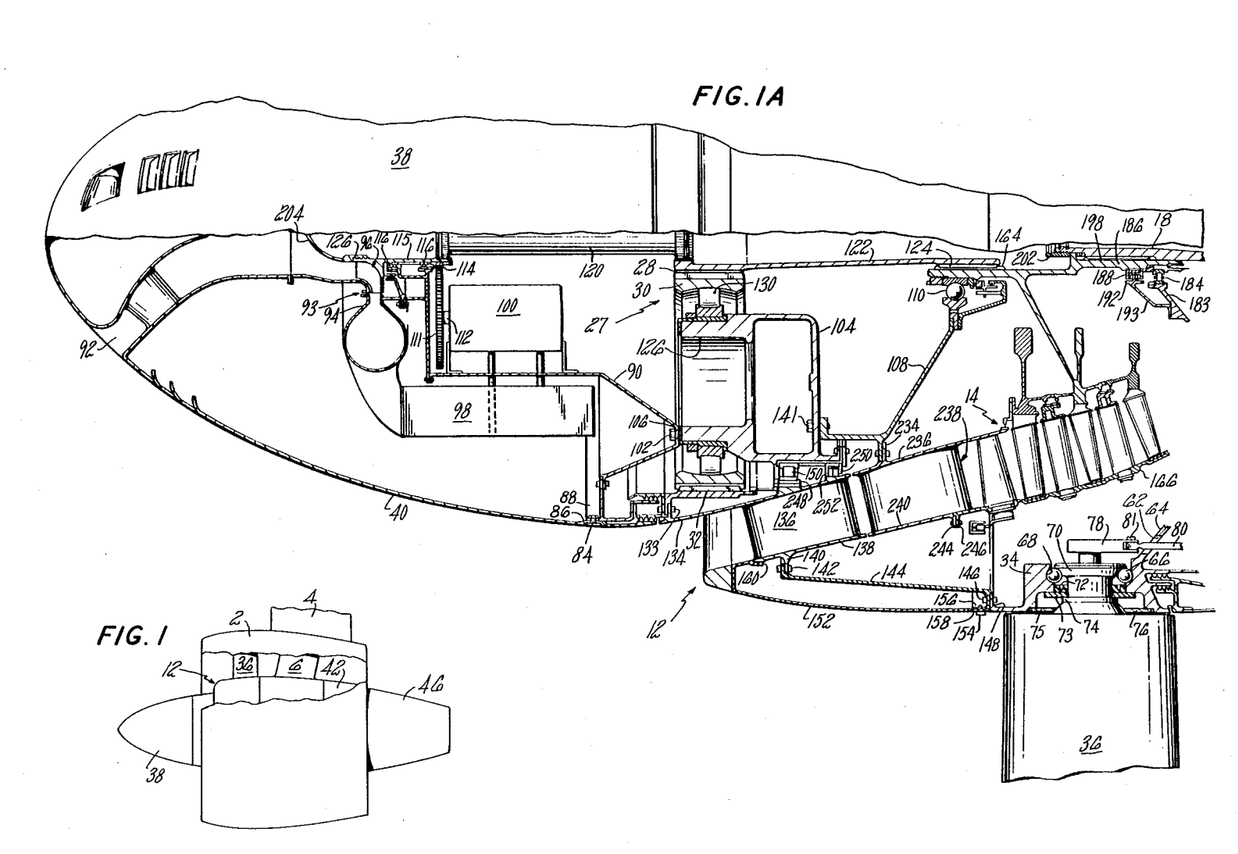

Referring first to FIG. 1, the engine is supported within a generally cylindrical main cowl 2, the later being supported from the aircraft by a pylon 4. This main cowl defines the outer wall of the path for the fan air through the device. Radial struts 6 extending inwardly from the cowl 2 engage an inner ring or sleeve 8 having axially spaced disk like flanges 10 and 11 extending inwardly therefrom and serving to support the core engine 12.

The core engine includes a multistage axial flow low pressure compressor 14 and a multistage low pressure turbine 16 connected by a low pressure shaft 18. The high pressure compressor 20 downstream of the low pressure compressor is driven from a high pressure turbine 22 being connected to the high pressure compressor 20 by a high pressure shaft 24 surrounding the low pressure shaft. Between the high pressure compressor and the high pressure turbine is a combustion chamber structure 26 where fuel is burned in the air passing through the engine in order to provide the energy to drive the turbines. The high pressure compressor, the combustion chamber and the high pressure turbine form a basic conventional structure and need not be described in detail. It will be understood that this module includes bearings for the high pressure compressor and for the high pressure turbine.

Attached to the forward end of the low pressure compressor is the gearbox structure 27 including a sun gear 28 driven from the low pressure shaft 18 and in mesh with pinions 30, only one of which is shown. The ring gear 32 surrounds the pinions gears and is connected, as will be described later, to the fan ring 34 in which the fan blades 36 are mounted. These blades extend across the fan air path and nearly into contact with the main cowl 2 near its forward end.

Mounted at the front of the gearbox structure is the nose cone structure 38 which may incorporate the engine lubricating structure as described in a copending U.S. application Ser. No. 067,340. Surrounding and enclosing the nose cone structure is a nose cone cowl 40 which defines the inner wall of the gas path to the compressor at the engine inlet.

Figure 1B:
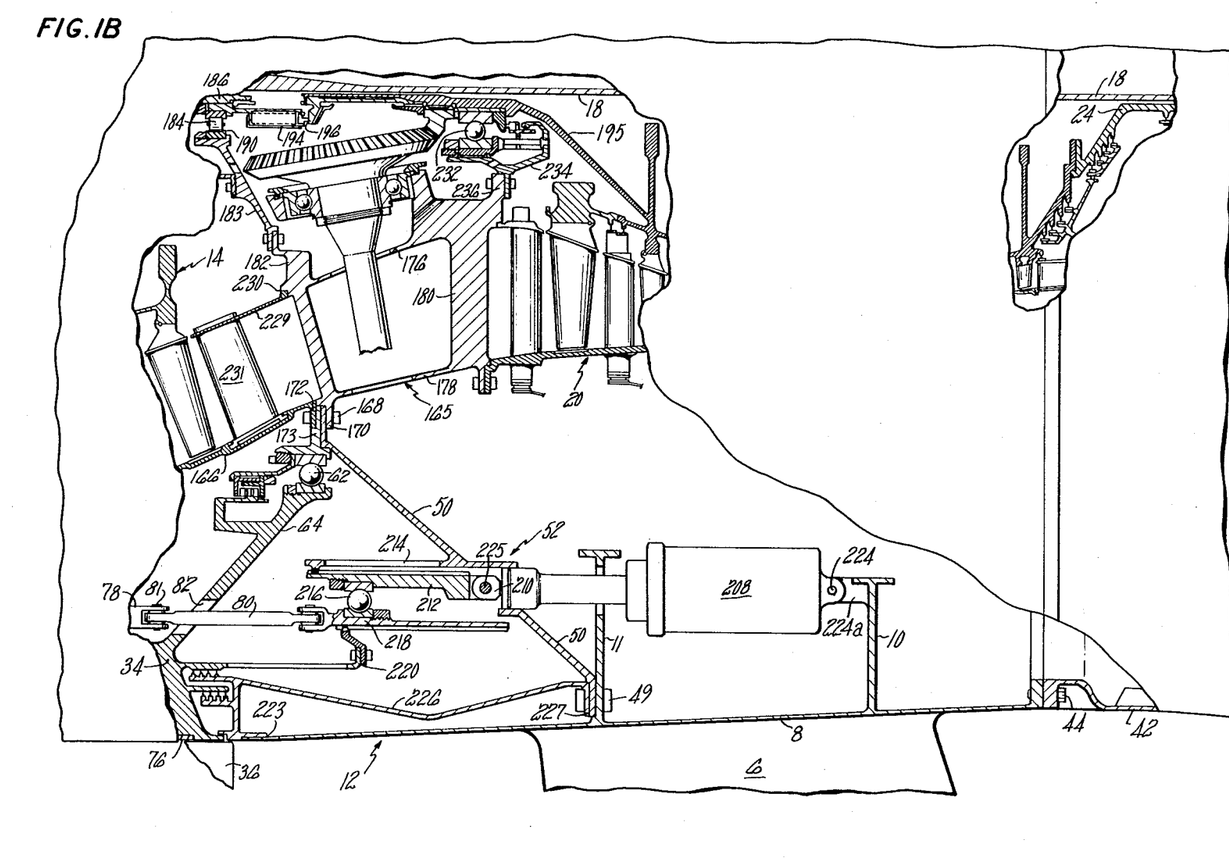
Figure 1C:
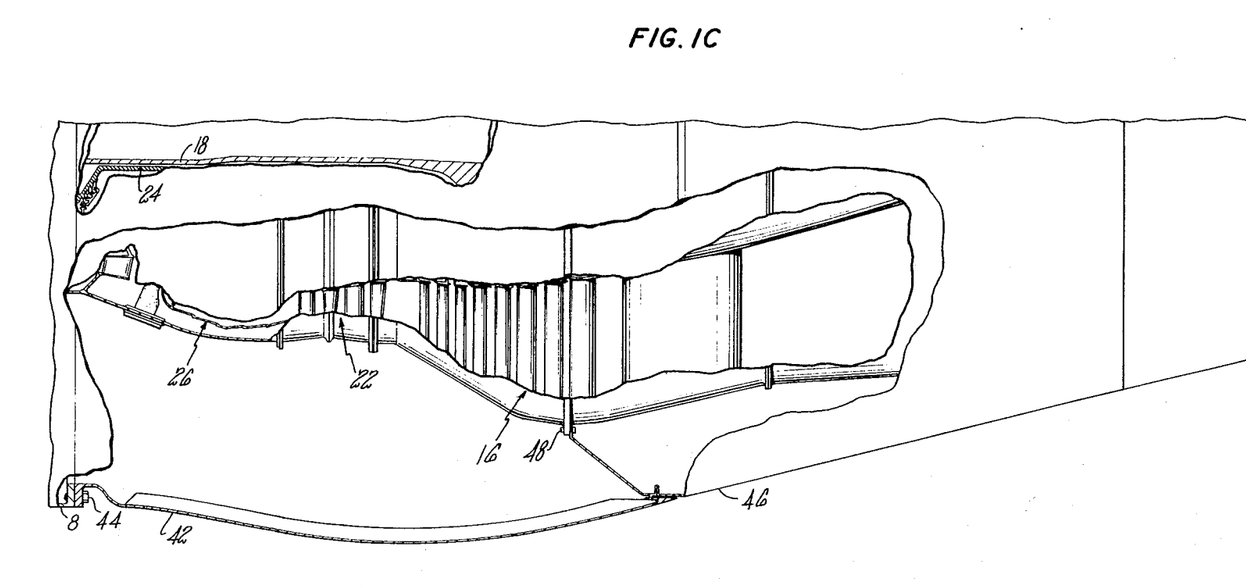

At the rearward part of the engine, the core cowl 42 is attached to the rearward end of the inner ring 8 as by bolts 44. This core cowl defines the inner wall of the gas path for gas leaving the fan. Within the core cowl 42 is an exhaust nozzle 46 secured at its forward end to the low pressure turbine casing by bolts 48 that are accessible when the core cowl is removed. The rearward end of the core cowl engages and pilots the outer portion of the exhaust nozzle at its forward end and thus supports the rearward end of the engine.

In this disassembly the core cowl 42 is removed from its attachment of the ring 8, this being by the row of bolts 44 accessible from within the fan air path. After this core cowl 42 is removed rearwardly the nozzle 46 may be removed from its attachment to the housing. This attachment is the row of bolts 48 accessible through the space made available by rearward removal of the cowl 42.

Removal of cowl 42 also permits access to a row of bolts 49 holding the flange 11 to a flange on the outer part of the housing 50 supporting the pitch changing mechanism 52 for the fan blades. Removal of this row of bolts 49 will separate the core engine from the struts 6.

For forward removal of the core engine as a unit, the fan blades must be removed. The fan blades are individually removable to permit the low pressure compressor surrounded by the fan and its module to be removed from the front of the main cowl. As shown in FIGS. 1A and 1B, the fan blades 36 are carried by the ring 34 which is supported on a bearing 62 mounted on the housing 50 and being carried on a conical element 64 integral with and extending inwardly from the ring 34. The fan blade roots are supported in bearing 66 in radial openings 68 in the ring. These bearings engage a flange 70 on the blade root and are held in position by ring 72. The ring in turn is held in place by a split collar 73 engaging under a flange 74 on the blade root. Access to the collars 74 is possible by removal of sleeves 75 and 76 mounted on the ring 34 just under the inner ends of the airfoil portion of the blade. These sleeves may be held in position by screws not shown engaging the ring, and by removal of these screws the sleeves, which are split, may be slid out axially for access to the collars. Removal of ring 72 also permits the removal of the bearings 68, and by turning the blade so that the arm 78 on the inner end of the blade extends forwardly the blade may be moved outwardly and forwardly for removal. The arm 78 will have been previously disconnected from the actuating link 80 by removal of one connecting pin 81, this link being utilized for pitch control of the blade. Slots 82 in the element 64 permit these links to extend therethrough.

With the fan blades removed, the entire core engine with the nose cone, gearbox structure, and the fan blade mechanism all attached thereto may be moved forwardly within the main cowl and removed as a unit from the aircraft. It will be obvious that the supporting bolts 49 would have been removed in order for this forward movement of the core engine.

The actuators 208 for the pitch changing mechanism will have been unpinned from the sleeve 212, hereinafter described in detail. The slip joint 223 between the seal member 226 and the inner shroud ring 8 also later described in detail permits axial movement at this location. The engine rearwardly of the flanges 10 and 11 is smaller in diameter than these flanges so the engine may be moved forwardly out of the surrounding structure as a unit.

Alternatively for convenience, portions of the forward parts of the engines may be removed separately, for example, the nose cone structure 38 may be removed as a unit by removing a row of bolts 84 attaching the rear edge of the nose cone cowl 40 to the gearbox structure at its periphery. The bolts 84 extend through bosses 86 in the rear edge of the nose cone cowl 40 and through a cylindrical flange 88 on a housing 90 forming a part of the lubricant mechanism enclosed within the nose cone cowl. The nose cone cowl 40 has inlet ducts 92 that separate by a sliding fit 93 from a shield 94 covering the impeller 96 of the air pump. In this way, the nose cone cowl is removable by direct forward motion.

With the removal of the nose cone cowl access is possible past the air-oil cooler 98 to a row of bolts 102 that hold the housing 90 to the reduction gear housing 104 for the fan drive.

With the removal of bolts 102, the lubricating and oiling system located within the nose cone is slideable forward as a unit. This system includes the air-oil cooler 98, and the scavenge and pressure pumps in a housing 100. The drive gear 111 for the shaft 112 for the pumps is in mesh with a pinion gear 114 on a shaft 115 in bearings 116 supported by a part of the housing 90. This shaft 115 also carries the impeller 96 for the air cooling flow through the air-oil cooler. Since the air connections and lubricant connections for these several elements are not a part of the present invention they will not be described in detail.

A drive sleeve 120 splined at both ends connects with the shaft 115 to a second drive sleeve 122. The second drive sleeve 122 is splined at 124 to the low pressure compressor rotor and carries at its forward end the sun gear 28.

The gearbox housing 104 has stubs shafts 126 thereon that support the pinion gears 30 on bearing 130. These pinion gears in turn are in mesh with the sun gear 28 and a surrounding ring gear 32. This ring gear is secured by bolts 133 to a sleeve 134 forming the inner wall or shroud of the gas path and is connected through vanes 136 to the outer shroud 138. The outer shroud has a flange 140 bolted as by bolts 142 to a ring 144, the other end of which is held as by bolts 146 to a flange 148 on the fan blade ring 34. The strut, consisting of the shrouds 134, 138 and the vanes 136, is mounted on the reduction gear housing 104 on bearing 150.

Access to bolts 142 and 146 is possible by removal of a shroud ring 152 forming the leading end of the inner wall of the fan gas path. The shroud ring is held in position by bolts 154 extending through cooperating cylindrical flanges 156 and 158 on the ring 144 and the shroud ring. Shroud ring 152 is piloted at its forward end by a sliding fit 160 with the shroud ring 138.

With the removal of bolts 141, connecting the gearbox housing 104 to the support structure 108, and also bolts 142 and 146, the reduction gear mechanism may be removed as a unit. The separation is possible at the drive mechanism since the splines 124 on the rearward end of the sleeve 122 have a sliding relation to the cooperating splines 164 on the low pressure compressor rotor shaft 186.

As a further breakdown, the engine may be separated between the low pressure compressor and high pressure compressor such that the entire portion of the engine forward of the inner immediate strut or case 165 between the low pressure compressor and high pressure compressor is separable as a complete unit. The housing 50 is connected to the case 165 that extends inwardly rearwardly of the low pressure compressor case 166 and is bolted thereto and to the housing 50 by bolts 168. These bolts hold the inner edge of the housing 50 to a flange 170 on the intermediate case 165 to a flange 172 on the low pressure compressor case 166 and to a flange 173 on the inner race for the bearing 62 at the inner end of the conical element 64.

The intermediate case 165 has inner and outer shrouds 176 and 178 connected by struts 180 that cross the gas path from the low pressure to the high pressure compressors. From the forward end of this intermediate case a flange 182 thereon supports a conical element 183 for the support of a bearing 184 mounted on a shaft 186 at the end of the low pressure compressor rotor. This bearing and the adjacent seal 188 also on the shaft have a sliding fit with the outer bearing race 190 and a cylindrical seal flange 192 at the inner edge of a ring 193 attached to the element 183 to permit axial disengagement at this point. The end of the shaft 186 also carries another seal 194 engaging with a flange 196 on the forward end of the high pressure compressor shaft 195 and is axially separable.

The end shaft 186 of the low pressure rotor is splined as at 198 to the drive shaft 18 extending forward from the low pressure turbine and is held thereon by a threaded clamping ring 202. Access to this clamping ring is possible by a suitable wrench extending rearwardly from the front end of the engine. To make this possible, the end cap 204 on the front end of the impeller shaft 115 is threaded as at 126 thereon for removal. With the removal of this cap a wrench may reach the ring 202 for removing it.

One further step is necessary to divide the engine between the low pressure and high pressure compressor. The pitch of the fan blade is controlled from a plurality of actuators 208, the actuating stems 210 of which are attached to a axially slideable sleeve 212 positioned in a guide 214 in the housing 50. The sleeve 212 carries a thrust bearing 216 connected it to a surrounding sleeve 218 in a guide ring 220 supported by the fan ring 34. The thrust bearing insures that the sleeves 212 and 218 will move axially in unison but with rotation permitted between them since the sleeve 212 is not rotatable and the sleeve 218 rotates with the fan ring. The sleeve 218 is connected by the links 80, above described, to the arms 78 on the individual fan blades. When the blades are to be removed or attached to the links 80, the actuators 208 are caused to move the ring 218 forward for access to the forward end of the rings through the space made accessible by removal of the sleeve 144. The actuators 208 are secured by pins 224 to suitable bosses 224a on the flange 10 carried by the strut 6.

To separate the actuator 208 from the sleeve 212, in separating the engine at the point between the two compressors, the actuators are caused to move the sleeve 212 as far to the rear as possible. Since the links 80 are now free of the blade arms, the sleeve 212 may move to the right beyond the position shown in the drawing giving access to the pins 225 that hold the stems 210 to the sleeve 212. These pins are accessible from in back of the flange 10, the core cowl 42 having previously been removed.

In this way, once the nose cone cowl 40 and the end cap 204 are removed, the ring 202 may be undone. Following that, the removal of the bolts 49 and 168 will permit the engine to be taken apart at the downstream end of the low pressure compressor. The inner shroud 8 from the strut 6 has a sliding connection 223 with a seal carrying member 226 surrounding the actuating mechanism for the blade pitch changing mechanism. This member has an end flange 227 by which it is secured by the same bolts 49 that hold the housing 50 to the flange 11 of the strut 6.

As a forward part of the engine is moved forward to separate the engine at the downstream end of the low pressure compressor, the inner shroud 229 on the last row of vanes 231 in the low pressure compressor separates from a piloting notch 230 on the intermediate housing 165, as the end of the low pressure compressor rotor 186 with the seal 188 and bearing 184 thereon, pulls forward from the surrounding ring 193 and flange 192, and the spline connection 198 permits the shaft 186 to slide from the end of the drive shaft 18.

With this arrangement the high pressure compressor shaft 195 is still supported in place at its upstream end to hold the high pressure compressor rotor in position. To accomplish this, a bearing 232 is supported in a ring 234 which is mounted on an inner flange 236 on the inner shroud 176 for the intermediate strut.

The support structure 108 for the bearing 110 is bolted at its outer end to a flange 234 on the inner shroud 236 of the support strut 238. The inner shroud 236 and an outer shroud 240 are interconnected by strut 238 extending across the gas path for air entering the low pressure compressor. The outer shroud has a flange 244 connected to a flange 246 on the low pressure compressor case.

It will be understood that the individual modules of the forward section of the engine may be separated from one another after this forward section has been removed as a unit. Once the nose cone cowl and nose cone with its enclosed structure are removed the gearbox structure may be removed as a unit. This is possible since with the removal of bolts 141, the housing 104 is free to move and the pinion gears on the housing are free to move axially on the ring gear. The bearing 150 is axially slideable on the outer bearing race 248 and an adjacent seal 250 on the housing is free to slide axially on its cooperating surface 252 on the inner shroud 134. The ring gear, the bearing, the race 248 and surface 252 are stepped in dimension so that the bearing and seal will both pass through the ring gear.

Once the forward module is removed from the core engine, the fan blade ring 34 and the pitch changing mechanism may be removed rearwardly as a unit from its surrounding relationship to the low pressure compressor. The removal of the bolts 146 releases the fan ring, and since the bolts 49 and 168 have been already removed, the housing 50 and conical structure 64 together with the ring 34 and the pitch changing mechanism will be removed rearwardly as a unit. This then leaves the low pressure compressor a module by itself and may be overhauled as desired or as required under the circumstances.

One further possible modular separation is the removal of the low pressure compressor, and the parts forwardly thereof from the remainder of the installation leaving the fan and the pitch changing mechanism still with the support structure. By removal of the bolts 168 and the disconnection of the fan ring 34 from the gearbox by removal of the drive sleeve 144, the fan ring and the pitch changing mechanism may remain with the low pressure compressor removed forwardly from within the supporting fan ring structure 50.

It should be understood that the invention is not limited to the particular embodiments shown and described herein, but that various changes and modifications may be made without departing from the spirit and scope of this novel concept as defined by the following claims.

We claim:

1. A gas turbine fan engine installation on an airplane pylon, the pylon including an annular cowl, struts extending inwardly from said cowl and having engine supports on the inner end,     an engine supported on said supports and defining between it and the cowl a path for fan air over said struts and around the engine,     engine attachment means securing said engine to said supports,     a fan including fan blades mounted on and driven by said engine and extending across said fan air path.

said engine including a compressor, a combustion section and a turbine, drive means for said fan including a reduction gear driven by said turbine and having a ring for supporting the fan blades,     means accessible from said air path for removing the individual fan blades from said ring,     means accessible from said air path for removing said attachment means for said engine to provide for removal of the entire engine axially from said cowl after removal of said fan blades and said attaching means.

2. An engine installation as in claim 1 in which the engine includes pitch changing means attached to said fan blades for changing the pitch thereof, and     means accessible from said air path for disengaging said pitch changing means to permit removal of the blades.

3. An installation as in claim 2 in which the engine includes a removable ring forming a part on the inner wall of the fan air path and in which the ring is removable by disengaging means accessible from the air path and in which the pitch changing mechanism attachment for the blades is accessible by removal of said ring.

4. An engine installation as in claim 1 in which a removably attached core cowl is attached by removable attachment means to the inner end of the struts and forms a part of the inner wall of the gas path extending rearwardly from said struts and in which the attachment means for said core cowl is accessible from said air path and in which removal of said cowl gives access to the engine attachment means, the engine rearwardly of said struts being smaller in diameter than the annulus defined by the inner ends of the struts for forward removal of the engine as an entirety through said annulus.

5. A gas turbine fan engine of the type adapted for installation on an airplane pylon having an annular cowl outwardly of the fan and struts extending inwardly from the cowl across the fan to core engine supports inwardly of the fan, wherein the improvement comprises:

a core engine having a forward section and a rearward section joined one to the other, each of the forward section and the rearward section being separable from the pylon independently of the other and without the necessity of removing the other from the airplane.

6. The invention according to claim 19 wherein the gas turbine fan engine has a low pressure compressor casing and a rotor within said casing,     a fan including a ring and blades in the ring supported externally of said casing,     a main strut surrounding the engine and supporting the engine and having a sleeve forming a part of the inner wall of the fan air path,     a housing secured by first bolts to said main strut and extending inwardly to the downstream end of the compressor case and being bolted to said casing by bolts accessible rearwardly of said housing,     a core cowl secured to and extending downstream from said sleeve and removably secured thereto,     a first support structure extending across the compressor gas path at the downstream end of the low pressure compressor and having an inwardly extending element carrying at its inner end a bearing for the downstream end of the compressor rotor,     a second structure extending across the gas path forwardly of said first structure and having a bearing inwardly of the gas path on which said structure is rotatable,     a sleeve surrounding said second structure and connecting said structure to said fan ring, second bolts accessible from said fan air path holding said sleeve to said ring,     said low pressure compressor and the parts of the engine forwardly thereof being removable as a unit by release of said first bolts and said second bolts by access from the fan air path.

7. A gas turbine engine installation as in claim 6 in which said sleeve is surrounded by a cowl ring forming a part of the inner wall of the fan air path and secured to said fan ring by other bolts accessible from said fan air path, removal of these other bolts and the cowl ring permitting access to said second bolts.

8. A gas turbine engine installation as in claim 6 in which the low pressure compressor rotor at its downstream end is axially slideable within the bearing support structure.

9. A gas turbine engine installation as in claim 8 in which the compressor rotor and drive shaft are held in axial position by a threaded ring on the end of the shaft, and in which this ring is accessible from the front end of the engine.

10. A gas turbine engine installation as in claim 6 in which the compressor rotor at its downstream end is axially slideable within the bearing support structure and in which the rotor is driven by a drive shaft to which said rotor is connected by axially extending splines permitting the engine to be separated axially at this point.

11. A gas turbine engine installation as in claim 10 in which there is an impeller sleeve at the forward end of the engine with a removable cap on this sleeve for access centrally of the engine axially for a tool to reach said threaded ring.

12. A gas turbine fan engine as in claim 11 in which the gearbox and drive gear are separable after removal of the nose cowl by removal of the fan cowl and the bolts holding the ring gear to the sleeve 134.

13. A gas turbine fan engine as in claim 11 in which the connecting structure is supported by a bearing surrounding the gearbox, this bearing being smaller in diameter than the ring gear and in which the gearbox and gearing may be removed as a unit without the ring gear since the surrounding bearing permits axial sliding movement, and the bearing and gearbox can move out within the ring gear, the teeth on the ring gear permitting axial sliding movement.

14. A gas turbine fan engine as in claim 13 in which the impeller shaft carries a geared ring in mesh with a pinion on the scavenge and pressure pump shaft.

15. A gas turbine fan engine in claim 14 in which the removal of the first bolts releases the bearing for the fan engine from the compressor casing.

16. The invention according to claim 5 wherein the gas turbine fan engine has
   a low pressure compressor including a rotor and casing,
   a fan ring surrounding the casing having fan blades therein extending across the fan gas path,
   supporting structure extending across the gas path at the inlet to the compressor,
   a bearing for the fan rotor at the forward end of said supporting structure,
   a gearbox secured by first bolts to said supporting structure,
   a sun gear, planet gears in mesh therewith and mounted for rotation on said gearbox, and a ring gear in mesh with said planet gears and surrounding said planet gears,
   a drive sleeve extending from said compressor rotor to said sun gear and having a spline connection with both for axially sliding movement,
   a connecting structure connecting the fan ring to said ring gear and extending across the compressor gas path forwardly of the supporting structure and including,
   a sleeve connecting said structure to said ring and being held by second bolts to both,
   a fan cowl surrounding said sleeve and forming the forward end of the inner wall f the fan air path, said cowl being secured by bolts to the sleeve,
   a nose cone including mechanism driven from said drive sleeve and including a housing secured to said gearbox by said third bolts,
   a second drive sleeve connecting said mechanism to said first drive sleeve and splines on the end of said second sleeve to permit axial movement therebetween,
   a nose cone cowl around said cone and secured by fourth bolts to the rearward end of said cone, said bolts being accessible from the fan gas path externally of said cowl, and
   said nose cowl being removable from said gearbox by removal of the third bolts holding the nose cone to said gearbox, the first bolts being accessible by removal of the nose cowl and said housing.

17. A gas turbine fan engine installation as in claim 16 in which the splines on the drive sleeve from the compressor rotor to the sun gear permit axial sliding movement at this point for forward movement of the gearbox in separating the parts.

18. The invention according to claim 5 wherein the gas turbine fan engine has a nose cowl with a lubricant system therein including a housing, scavenge and pressure lubricant pumps in the housing, an air oil cooler for the lubricant, an impeller for causing cooling air flow through the air oil cooler, a nose cone cowl for the cone having an air inlet connection to the duct connecting to the said impeller, the latter having a surrounding case, a sleeve supporting the impeller and having a removable threaded cap at its forward end, drive means for said impeller extending rearwardly from said housing, drive means for said impeller being splined thereto for axial separation, bolts securing said cowl to said housing at the rearward end of said cowl, said bolts being accessible externally of said cowl, said inlet ducts having an axially sliding connection to said impeller case and said cowl having an axially slideable connection to said housing at the rearward end of said shield, supporting structure for said housing located rearwardly of said housing and second bolts securing said housing to said structure, said second bolts being accessible from within the cowl upon removal of the cowl whereby the entire nose cone with its associated structure therein is removable as a unit from the supporting structure to which it is secured.

19. The invention according to claim 5 wherein the gas turbine fan engine has a low pressure compressor case, a compressor rotor within the case and a fan ring surrounding said case, a bearing secured by first bolts to said case and on which the ring is supported for rotation, a surrounding cowl ring, struts extending inwardly from said ring and defining a fan air path, supports on the inner ends of the struts for the engine, a housing extending inwardly from the supports to the low pressure compressor casing and secured thereto by said first bolts, fan blades secured to said ring and being rotatable on their own axes for pitch changing, each blade having an arm on its inner end,
   pitch changing mechanism for said blades including an actuator secured to said mounts, a sleeve supported by said housing and axially movable by said actuators to which it is pinned, a second sleeve mounted for rotation on said first sleeve and also guided by said housing for axial movement, a thrust bearing between said sleeves to cause them to move axially in unison, links connecting said second sleeve to said fan arms, a strut extending across the compressor gas path at the forward end of the compressor and having a support inwardly of the path for a bearing for the compressor rotor, a reduction gear drive for said fan forward of the compressor, a connecting structure from said drive to said fan ring, said structure carrying a ring gear at its inner end and extending across the gas path, the outer end of said structure being secured by second bolts to said ring, said fan and actuating mechanism being removable as a unit from its position around the compressor after the latter is removed from the rest of the engine by removal of said second bolts, the actuators being previously disconnected from said first sleeve by removal of the connecting pins before removal of the low pressure compressor and associated structure from the remainder of the installation.

20. The invention according to claim 5 wherein the gas turbine fan engine has a low pressure compressor and a high pressure compressor, wherein the forward section of the engine comprises the low pressure compressor and components forward thereof and wherein the rearward section of the engine comprises the high pressure compressor and components rearward thereof.

21. The invention according to claim 20 wherein the forward section and the rearward section are separable on from the other at bolts joining the low pressure compressor to the high pressure compressor and at a spline joining the rotor of the low pressure compressor to a shaft extending forwardly through the center of the high compressor.

22. The invention according to claim 5 which further includes a fan rotor and pitch changing mechanism mounted within a housing attached to the core engine supports and wherein the forward section and the rearward section of the engine are attached onto the other at said housing.

23. The invention according to claim 22 wherein the fan rotor and the pitch changing mechanism are separable from the pylon with the forward section.

* * * * *

UNITED STATES PATENT AND TRADEMARK OFFICE
CERTIFICATE OF CORRECTION

PATENT NO. : 4,934,140

DATED : June 19, 1990

INVENTOR(S) : William T. Dennison et al

It is certified that error appears in the above-identified patent and that said Letters Patent is hereby corrected as shown below:

Column 8, Claim 6, line 1, after "claim" change "19" to --5--

Column 9, Claim 14, line 6, after "geared" insert --driving--

Column 9, Claim 16, line 37, after "inner wall" delete "f" and insert --of--

Column 10, Claim 21, line 64, before "from the other" delete "on" and insert --one--

Signed and Sealed this

Twenty-seventh Day of August, 1991

Attest:

HARRY F. MANBECK, JR.

*Attesting Officer*     *Commissioner of Patents and Trademarks*